Patented Nov. 16, 1943

2,334,500

UNITED STATES PATENT OFFICE 2,334,500

NEUTRALIZATION OF AROMATIC SULPHONIC ACIDS

Stuart P. Miller, Scarsdale, N. Y., assignor, by mesne assignments, to Allied Chemical & Dye Corporation, a corporation of New York No Drawing. Application June 6, 1941, Serial No. 396,877

6 Claims. (Cl. 260—505)

This invention relates to a process for neutralizing aromatic sulphonic acids, more particularly to the neutralization of benzene sulphonic acid produced in the manufacture of synthetic phenol from benzene.

As is well known, synthetic phenol may be manufactured from benzene by sulphonating benzene, neutralizing the benzene sulphonic acid thus formed with an alkali, fusing the alkali sulphonate with a strong alkali, separating the alkali phenolate thus formed, and recovering phenol therefrom. The step of neutralizing the benzene sulphonic acid to form the alkali sulphonate is carried out by contacting the sulphonic acid with a relatively dilute aqueous solution of either an alkali metal hydroxide or an alkali metal salt of a weak acid whereby a solution of the alkali sulphonate in water is obtained. After considerable practice of the above described process for the manufacture of phenol it has been realized that in order to successfully and economically carry out the step of the process involving fusion of the alkali sulphonate with a strong alkali, the alkali sulphonate employed should be anhydrous; therefore, large amounts of water are evaporated from the solution obtained upon neutralization of the sulphonic acid in order to produce the anhydrous sulphonate. Such an evaporation step involves the operation and maintenance of large and cumbersome evaporators and introduces considerable expense into the synthetic phenol process. However, since neutralization of the benzene sulphonic acid with an alkali is an ionic reaction, it was deemed necessary to carry out the neutralization in a relatively dilute aqueous solution so that conditions favorable to ionic reactions could be realized. As a result, evaporation of the water after the neutralization had been completed has always been regarded by those skilled in the art as an unavoidable necessity.

An object of this invention is to provide a novel process for the neutralization of aromatic sulphonic acids.

A more specific object of this invention is to provide a process for the neutralization of benzene sulphonic acid whereby an alkali benzene sulphonate product may be obtained of a nature such that the necessity of evaporating large amounts of water therefrom prior to fusion with strong alkali is obviated.

I have made the surprising discovery that aromatic sulphonic acids may be readily neutralized by contact with an alkali metal hydroxide or with an alkali metal salt of a weak acid, the anhydride of which is gaseous, in the presence of an amount of water substantially less than that required to completely dissolve the reactants. The preferred embodiment of my invention involves an improvement in the step of neutralizing benzene sulphonic acid prepared in the sulphonation process for producing phenol and comprises contacting the benzene sulphonic acid with sodium sulphite in the presence of an amount of water less than about half of the amount required to completely dissolve the reactants and preferably equivalent to between about 10% and about 50% of the sulphonic acid, since by operating in this manner I have found that a product is obtained which, with little or no evaporation, may be directly fused with a strong alkali to yield the phenolate. The sodium sulphite employed in accordance with my preferred embodiment may be obtained as a reaction product from the step in the synthetic phenol process in which the sodium benzene sulphonate is fused with a strong alkali; furthermore, the sulphur dioxide produced upon neutralization of the acid with the sodium sulphite may advantageously be employed for liberating the desired phenol from the sodium phenolate formed in the fusion step.

The success of my novel process is particularly surprising, since the amount of water employed does not approximate the amount required to dissolve the reacting ingredients; according to the knowledge heretofore available to the art, complete neutralization of the benzene sulphonic acid could not readily be achieved under such conditions because of the ionic nature of the reaction. I have found, however, that by operating in accordance with my invention benzene sulphonic acid may be completely neutralized. My invention eliminates or largely obviates the necessity of evaporating water from the neutralized sulphonic acid reaction product prior to fusion and thereby greatly simplifies the entire synthetic phenol process.

In carrying out the preferred embodiment of my invention as applied to the neutralization of benzene sulphonic acid produced in the sulphonation process for the manufacture of synthetic phenol, the acid to be neutralized may be mixed with sodium sulphite and an amount of water equivalent to between about 10% and about 50%, preferably in the neighborhood of about 15%, of the sulphonic acid, so as to form a mass of the consistency of a fluid paste or slurry, and the mass then agitated in order to thoroughly contact the reacting ingredients with one another; the agitating means employed are preferably grinders or kneaders, particularly when small amounts of water of the order of 15% or less of the acid are employed, in order to effect intimate contact of the reactants and thus achieve complete neutralization. The neutralization may be most advantageously carried out upon the molten sulphonation product as it emerges from the sulphonator but the finely ground solidified product may also be treated.

The order in which the reactants and water are mixed may vary. Thus, for example, the entire amounts of sulphonic acid, sulphite and water may be mixed and the mixture agitated, or the water may be admixed with either the sulphonic acid or the sulphite and the other reactant then added to the mixture with agitation. The neutralization may also be accomplished by mixing the sulphonic acid and sulphite in dry condition for a substantial period of time, then adding water in the amounts above indicated and completing the neutralization; when carrying out the neutralization in this manner I have found that about 80% or more of the acid is neutralized by the sulphite in the absence of the added water and that the addition of the small amounts of water to the dry reaction mass effectively causes the neutralization to go to completion in a short time. If desired, the neutralization may be carried out continuously by continuously agitating the sulphonic acid, sulphite and water and continuously recovering the reaction mass from the vessel; a convenient method of continuously carrying out the neutralization involves continuously adding the sulphonic acid, sulphite and water to a vessel provided with agitating means and maintained at a temperature between about 40° and about 80° C., preferably between about 60° and about 80° C. and continuously withdrawing the reaction mass from the vessel to another vessel or vessels provided with agitating means and maintained at somewhat higher temperatures so as to complete the neutralization and at the same time evaporate a portion, at least, of the small amount of water present.

The sodium sulphite preferably employed is that produced in a subsequent step of the process involving fusing the sodium benzene sulphonate produced by my invention with sodium hydroxide to yield sodium phenolate and sodium sulphite. The amount of sodium sulphite used to react with the acid is preferably slightly in excess of that required to neutralize the benzene sulphonic acid in order to insure complete neutralization. While I prefer to employ an amount of water less than about half that required to completely dissolve the reactants and varying between about 10% and 50% of the sulphonic acid, amounts above or below this range may be employed without seriously interfering with the neutralization procedure; thus, for example, if the reactants are mixed in an efficient grinder, neutralization may be accomplished with amounts of water of the order of 1% of the acid. The temperature at which the neutralization is commenced may vary from about 20° to about 100° C., depending upon the amount of water employed, the relatively low temperatures being suitable when water in an amount of, for example, 50% of the sulphonic acid is present; preferably, however, temperatures above the melting point of the sulphonic acid are used since the molten acid is easier to handle. When employing the preferred amount of water, i. e., about 15% of the sulfonic acid, the temperature at which neutralization is begun is preferably between about 60° and about 100° C. It will be found that due to the exothermic nature of the neutralization reaction, the temperature of the mass will tend to rise if relatively low temperatures of operation are used at the beginning. If desired, temperatures higher than 100° C. may be employed at the close of the neutralization in order to evaporate some of the water present. The time required for achieving substantially complete neutralization of the sulphonic acid may vary widely, depending somewhat on the efficiency of the agitating means, and thus may be from about 5 minutes to about 4 hours or longer, the relatively long periods of time being employed if it is desired to effect evaporation of the small amounts of water present in the mass coincidental with the neutralization.

During the neutralization it will be observed that sulphur dioxide is generated and liberated from the reaction mass. This gas is ordinarily in relatively concentrated form and may thus be advantageously recovered and employed as desired, e. g., for the liberation of phenol from sodium phenolate in a subsequent step of the synthetic phenol process.

The neutralized sulphonic acid product obtained upon carrying out the above operations is comparatively dry and in practically every case may be mixed directly with sodium hydroxide and fused to produce sodium phenolate without the necessity of further evaporating the water which may be associated therewith. If desired, the small amount of water may be removed by evaporation, but if the material is to be used in the synthetic phenol process this is ordinarily unnecessary. The product may contain a slight amount of sodium sulphate due to neutralization of sulphuric acid present in the sulphonic acid, but ordinarily the presence of a small amount of this salt is not detrimental since it does not affect the subsequent fusion step in any degree.

While particular reference has been made to the use of sodium sulphite in accordance with my invention, it is to be understood that other alkali metal sulphites, e. g. potassium sulphite, may also be used in many instances; for example, in the synthesis of resorcinol the benzene disulphonic acid produced on sulphonation is preferably neutralized with a potassium compound and then fused with potassium hydroxide, so that in this case the use of potassium sulphite in accordance with my invention would be preferred. Furthermore, substances other than sulphites may be employed; thus, for example, alkali metal hydroxides such as sodium or potassium hydroxide and alkali metal salts of weak acids, the anhydrides of which are gaseous, such as sodium or potassium carbonate and sodium or potassium bicarbonate, may all be employed in the practice of this invention. Furthermore, my invention is not intended to be limited to the neutralization of benzene sulphonic acid, since it is applicable to neutralization of aromatic sulphonic acids generally, including the mono- and poly-sulphonic acids of the mono- and poly-nuclear aromatic hydrocarbons such as benzene disulphonic acid, toluene sulphonic acids, naphthalene sulphonic acids, and similar compounds.

The following examples are illustrative of my invention. Amounts are given in parts by weight.

*Example 1.*—100 parts of crude benzene sulphonic acid, produced by reaction of benzene with sulphuric acid, were mixed gradually with about 44 parts of sodium sulphite over a period of about 20 minutes; at the end of this time 17 parts of water were added to the mixture and the mass was then thoroughly ground at a temperature of about 95° C. for about 65 minutes. The sulphur dioxide evolved was collected and stored. At the end of this time a comparatively dry, substantially neutralized product was obtained. This product was eminently suitable for fusion with sodium hydroxide to produce sodium phenolate.

*Example 2.*—A mixture composed of crude benzene sulphonic acid, sodium sulphite and water in the proportions of about 45 parts of sodium sulphite and 15 parts of water per 100 parts of the acid was fed continuously to a vessel provided with agitating means and maintained at a temperature between about 60° and 80° C. The reaction product was continuously withdrawn from the first vessel and passed through two similar vessels in series maintained at between about 110° and 120° C., part of the water evaporating from these vessels being returned to the mixture in the first vessel in order to compensate for water lost by evaporation, and the reaction product being continuously withdrawn. The rate of feed of the acid, sulphite and water and the rate of withdrawal of product were adjusted so that the mixture remained in the vessels for about 40 minutes. A comparatively dry, substantially neutralized product was obtained.

*Example 3.*—100 parts of p-toluene sulphonic acid, containing 23 parts of water, produced by reaction of toluene with sulphuric acid, were gradually mixed with about 33 parts of sodium sulphite over a period of 50 minutes, and the mass then thoroughly ground at a temperature of about 90° C. for about 4 hours and 50 minutes. The sulphur dioxide evolved was collected and stored. At the end of this time a comparatively dry, substantially completely neutralized product was obtained.

From the above description it will be evident that my invention possesses many practical and economic advantages, particularly in connection with the synthetic phenol art; hence, it will be of great interest to those engaged in the production of synthetic phenol.

Since certain changes may be made in carrying out the above process without departing from the scope of the invention, it is intended that all matter contained in the above description shall be interpreted as illustrative and not in a limiting sense.

I claim:

1. An improved process for the neutralization of aromatic sulphonic acids which comprises mixing an aromatic sulphonic acid with an alkali metal sulphite in the presence of an amount of liquid water equivalent to between about 10% and about 50% of the weight of the sulphonic acid, and recovering the alkali aromatic sulphonate produced.

2. An improved process for the neutralization of benzene sulphonic acid which comprises mixing benzene sulphonic acid with an alkali metal sulphite in the presence of an amount of liquid water equivalent to between about 10% and about 50% of the weight of the benzene sulphonic acid, and recovering the alkali benzene sulphonate and the sulphur dioxide generated.

3. An improved process for the neutralization of benzene sulphonic acid which comprises mixing benzene sulphonic acid with sodium sulphite in the presence of an amount of liquid water equivalent to between about 10% and about 50% of the weight of the benzene sulphonic acid, and recovering the sodium benzene sulphonate and the sulphur dioxide generated.

4. An improved process for the neutralization of benzene sulphonic acid which comprises mixing benzene sulphonic acid with sodium sulphite in the presence of an amount of liquid water equivalent to about 15% of the weight of the benzene sulphonic acid, and recovering the sodium benzene sulphonate and the sulphur dioxide generated.

5. An improved process for the neutralization of benzene sulphonic acid which comprises mixing benzene sulphonic acid with substantially dry sodium sulphite, adding an amount of liquid water to the mixture equivalent to between about 10% and about 50% of the weight of the sulphonic acid, continuing the mixing until neutralization is substantially complete, and recovering the sodium benzene sulphonate and the sulphur dioxide generated.

6. In a process for the manufacture of phenol involving sulphonating benzene, neutralizing the benzene sulphonic acid, fusing the sulphonate with an alkali metal hydroxide to produce an alkali phenolate and liberating phenol from the alkali phenolate, the improvements which comprise neutralizing the benzene sulphonic acid with sodium sulphite in the presence of an amount of liquid water equivalent to between about 10% and about 50% of the weight of the benzene sulphonic acid, recovering the sodium benzene sulphonate and the sulphur dioxide generated, fusing the sulphonate with sodium hydroxide, separating the sodium phenolate thus formed from the sodium sulphite, and liberating phenol from the sodium phenolate by contact with the sulphur dioxide recovered in the neutralization step.

STUART P. MILLER.